US012713446B2

(12) United States Patent
Wu et al.

(10) Patent No.: US 12,713,446 B2
(45) Date of Patent: Aug. 18, 2026

(54) SELF-INTERFERENCE MEASUREMENT FOR FULL DUPLEX AUTONOMOUS SIDELINK COMMUNICATION

(71) Applicant: QUALCOMM Incorporated, San Diego, CA (US)

(72) Inventors: Shuanshuan Wu, San Diego, CA (US); Kapil Gulati, Belle Mead, NJ (US); Junyi Li, Fairless Hills, PA (US); Navid Abedini, Basking Ridge, NJ (US); Anantharaman Balasubramanian, San Diego, CA (US); Hui Guo, Beijing (CN); Sourjya Dutta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 505 days.

(21) Appl. No.: 18/037,759

(22) PCT Filed: Jan. 26, 2021

(86) PCT No.: PCT/CN2021/073694

§ 371 (c)(1),
(2) Date: May 18, 2023

(87) PCT Pub. No.: WO2022/160080

PCT Pub. Date: Aug. 4, 2022

(65) Prior Publication Data

US 2024/0008055 A1 Jan. 4, 2024

(51) Int. Cl.

*H04W 72/25* (2023.01)
*H04W 16/28* (2009.01)
*H04W 72/541* (2023.01)

(52) U.S. Cl.

CPC .......... *H04W 72/25* (2023.01); *H04W 16/28* (2013.01); *H04W 72/541* (2023.01)

(58) Field of Classification Search

CPC ... H04W 72/25; H04W 16/28; H04W 72/541; H04W 72/1215; H04L 5/001;

(Continued)

(56) References Cited

U.S. PATENT DOCUMENTS

2019/0260485 A1* 8/2019 Byun .................... H04W 4/40
2020/0358500 A1* 11/2020 Ryu .................... H04B 7/0695

(Continued)

FOREIGN PATENT DOCUMENTS

WO 2020035142 A1 2/2020
WO WO-2020068906 A1 * 4/2020 .......... H04W 72/046
WO WO-2020173536 A1 * 9/2020 ............ H04W 76/14

OTHER PUBLICATIONS

International Search Report and Written Opinion—PCT/CN2021/073694—ISA/EPO—Jul. 27, 2021.

*Primary Examiner* — Rina C Pancholi

(74) *Attorney, Agent, or Firm* — Procopio, Cory, Hargreaves

(57) ABSTRACT

A sidelink device apparatus is disclosed. The apparatus may transmit, in a first transmission occasion, SCI indicating a resource reservation for a self-interference measurement in a second transmission occasion. The apparatus may transmit a signal, in the second transmission occasion. The apparatus may perform the self-interference measurement based on the signal in the second transmission occasion using at least a portion of resources indicated in the resource reservation.

30 Claims, 15 Drawing Sheets

(58) Field of Classification Search
CPC ... H04L 5/0023; H04L 5/0048; H04L 5/0082; H04L 5/0091; H04L 5/14; H04L 5/1461; H04B 7/0617; H04B 7/0665
See application file for complete search history.

(56) References Cited

U.S. PATENT DOCUMENTS

2022/0069884 A1* 3/2022 Zhang .................. H04B 7/0695
2022/0225124 A1* 7/2022 Suh ........................... H04L 5/14
2023/0361955 A1* 11/2023 Ganesan ............... H04L 5/0048

* cited by examiner

SELF-INTERFERENCE MEASUREMENT FOR FULL DUPLEX AUTONOMOUS SIDELINK COMMUNICATION

CROSS REFERENCE TO RELATED APPLICATION(S)

This application is National Stage Application filed under 35 U.S.C. § 371 of PCT International Application Serial No. PCT/CN2021/073694 entitled "SELF-INTERFERENCE MEASUREMENT FOR FULL DUPLEX AUTONOMOUS SIDELINK COMMUNICATION" and filed on Jan. 26, 2021, which is expressly incorporated by reference herein in its entirety.

BACKGROUND

Technical Field

The present disclosure relates generally to communication systems, and more particularly, to sidelink communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may include direct communication between devices based on sidelink, such as in vehicle-to-everything (V2X) and/or other device-to-device (D2D) communication. There exists a need for further improvements in sidelink technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may transmit, in a first transmission occasion, sidelink control information (SCI) indicating a resource reservation for a self-interference measurement in a second transmission occasion. The apparatus may transmit a signal, in the second transmission occasion. The apparatus may perform the self-interference measurement based on the signal in the second transmission occasion using at least a portion of resources indicated in the resource reservation.

In an aspect of the disclosure, a method, a computer-readable medium, and an apparatus are provided. The apparatus may be a first UE. The apparatus may receive, in a first transmission occasion, SCI from a second UE indicating a resource reservation for a self-interference measurement in a second transmission occasion. The apparatus may exclude resources indicated in the resource reservation from candidate resources for a sidelink transmission by the first UE.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
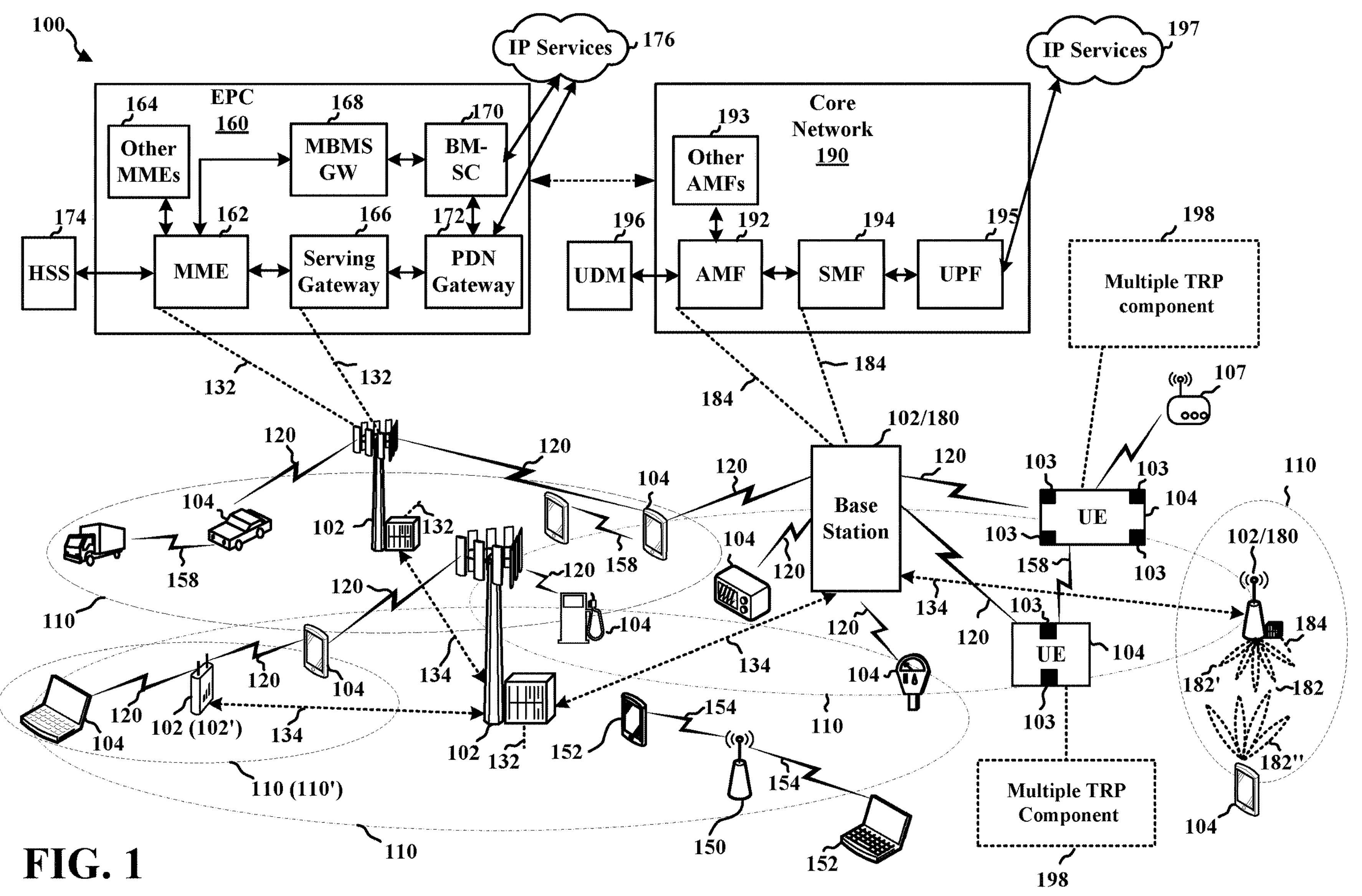
FIG. 1 is a diagram illustrating an example of a wireless communications system and an access network including sidelink communication.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100 including base stations 102 and 180 and UEs 104. A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as abase station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc.

A sidelink device may include multiple transmitter-receiver points (TRPs). For example, a vehicle may have multiple antenna panels, such as a front antenna panel and a rear antenna panel. Larger vehicles may have more than two TRPs. Although examples are provided for vehicular sidelink communication, the aspects presented here are applicable to non-vehicular sidelink devices and are not limited to a vehicle application. FIG. 1 illustrates UEs 104 having multiple TRPs 103. TRPs are different radio frequency (RF) modules having a shared hardware and/or software controller. A UE 104 may schedule sidelink communication per TRP 103. In some examples, the UE 104 may be capable of concurrent communication via the multiple TRPs 103, e.g., communication via different TRPs that overlaps in time. For example, the UE 104 may transmit a first transmission via a first TRP that overlaps in time, at least partially, with a second transmission via a second TRP. In some examples, the UE 104 may be capable of full-duplex communication in which the UE transmits via one TRP concurrently with reception via a second TRP. For example, a UE may transmit a sidelink transmission via a front antenna panel while receiving sidelink communication via a rear antenna panel.

In a first sidelink resource allocation mode, a UE may receive a resource allocation for sidelink communication from a central entity, such as a base station 102 or 180. The sidelink resource allocation from a base station may be referred to as "resource allocation mode 1" or a "centralized" resource allocation mode, e.g., in which a network entity allocates sidelink resources for multiple sidelink devices. In a second resource allocation mode, a UE 104 may autonomously determine resources for sidelink transmissions by sensing, or monitoring, for reservations of other sidelink devices. The autonomous resource selection may be referred to as "resource allocation mode 2," a "decentralized" resource allocation mode, or a sensing based sidelink resource allocation mode, e.g., where each sidelink device selects its own sidelink resources for sidelink transmissions. In the decentralized sidelink resource allocation mode, rather than receiving an allocation of sidelink resources from a network entity, a UE 104 may determine the sidelink transmission resource(s) based on a sensing and resource reservation procedure.

The decentralized resource allocation may be based on half duplex communication that does not include transmission and reception by a sidelink device that overlaps in time. The decentralized resource allocation may consider the potential for interference with communication for other sidelink devices, but may not address the potential for self-interference. For example, a transmission from a first TRP of a UE may be received by a second TRP of the UE and may cause interference to sidelink reception at the second TRP if it is performed concurrently with the transmission from the first TRP, e.g., in a full-duplex mode. The UE 104 may perform a self-interference measurement (SIM) to measure the signal that is transmitted by the first TRP and received by the second TRP of the UE.

Aspects presented herein provide SIM measurement and management for full-duplex sidelink communication, such as full-duplex V2X communication. For example, a UE 104, or another device communicating based on sidelink, may include a multiple TRP component 198 configured to transmit, in a first transmission occasion, SCI indicating a resource reservation for a self-interference measurement in a second transmission occasion. The multiple TRP component 198 may be configured to transmit a signal, in the second transmission occasion. The multiple TRP component 198 may be configured to perform the self-interference measurement based on the signal in the second transmission occasion using at least a portion of resources indicated in the resource reservation. The aspects presented herein may enable self-interference management for full-duplex capable sidelink devices, which may facilitate improved full-duplex operation for sidelink communication based on an autonomous resource allocation mode.

In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtoc ells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
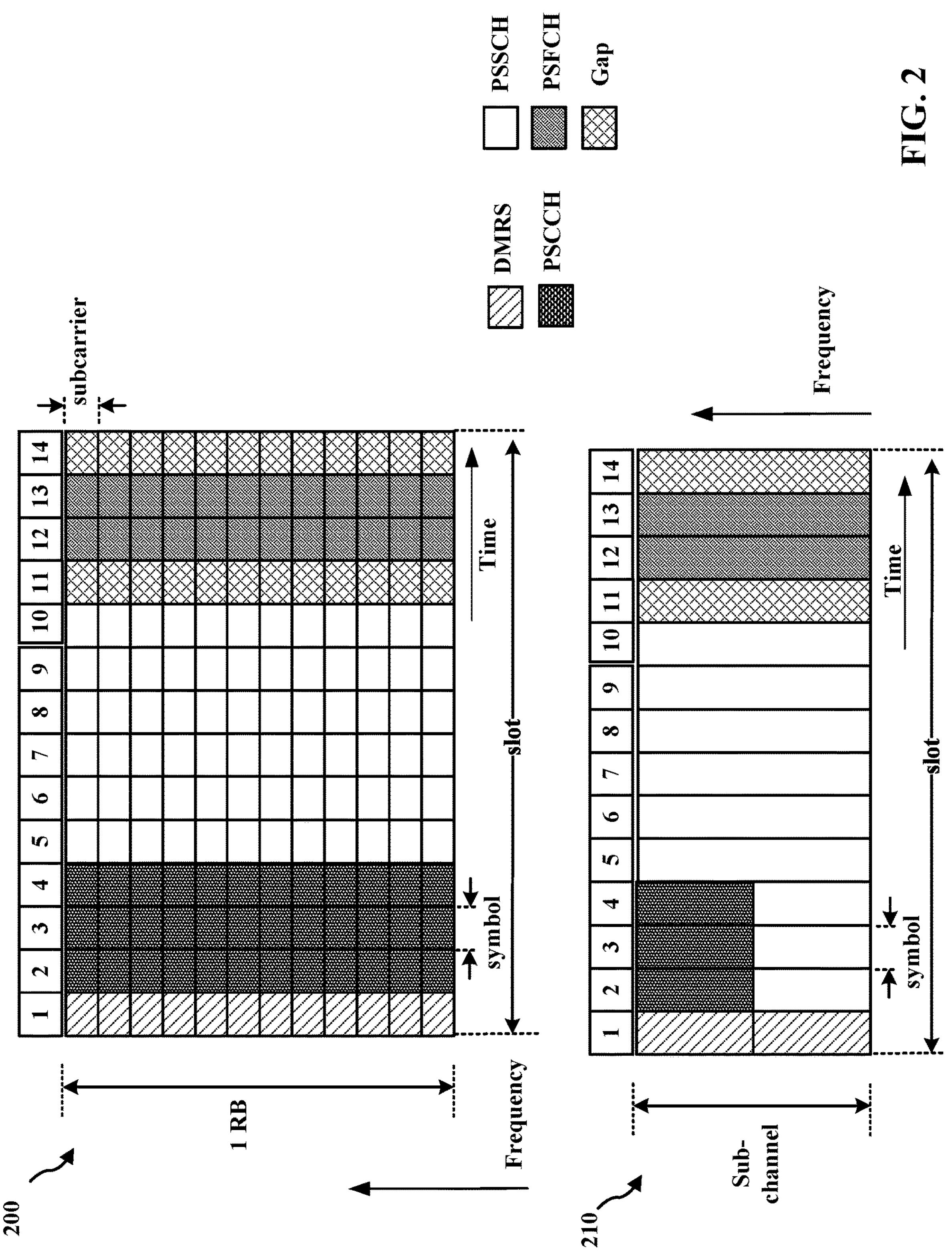
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may include 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of SCI, and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may include the data message described herein. The position of any of the data, DMRS, SCI, feedback, gap symbols, and/or LBT symbols may be different than the example illustrated in FIG. 2. Multiple slots may be aggregated together in some examples.

Figure 3:
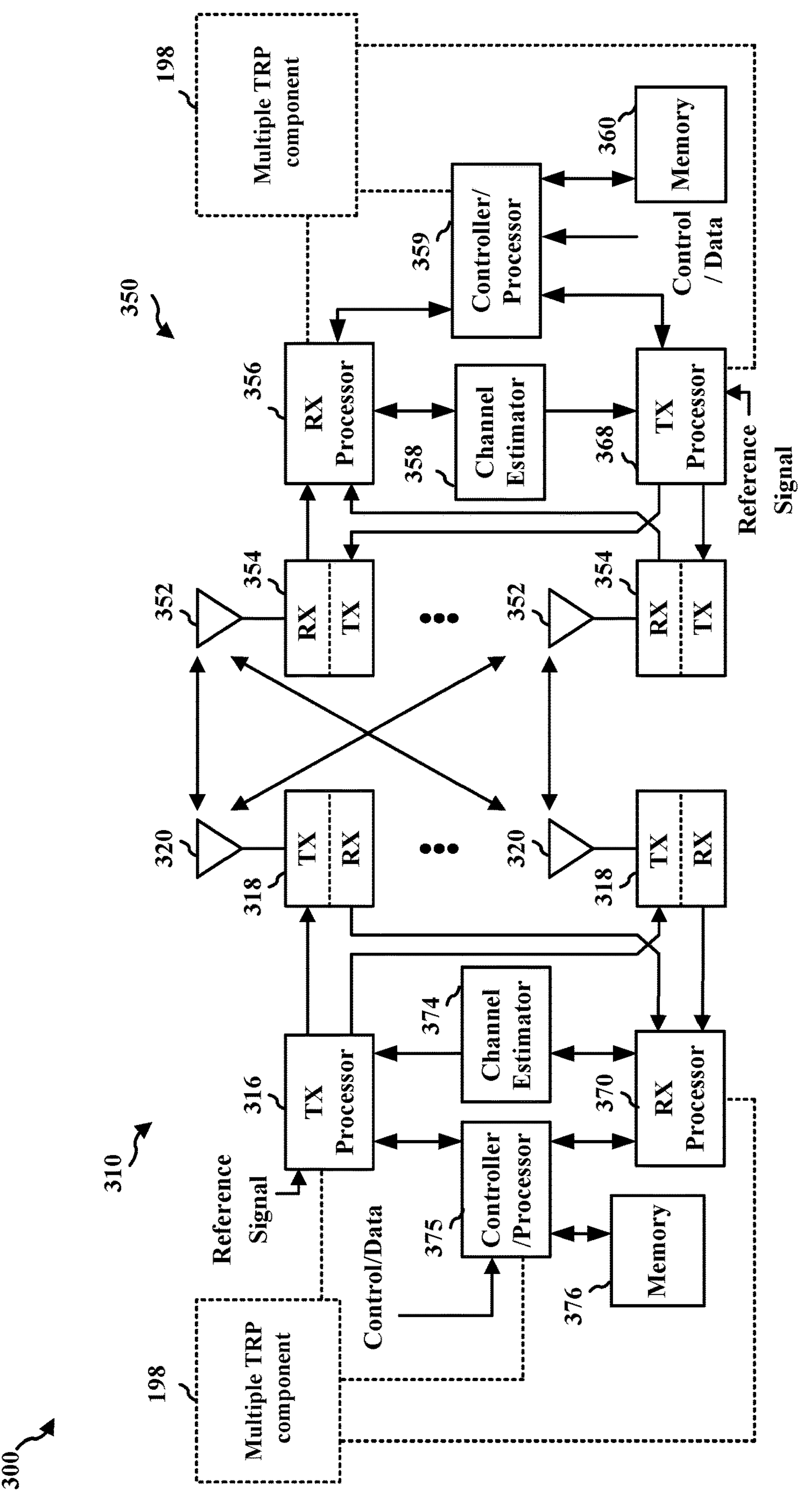
FIG. 3 is a diagram illustrating an example of a first device and a second device involved in wireless communication based, e.g., on sidelink.

FIG. 3 is a block diagram 300 of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may include a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BP SK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

As illustrated in FIG. 3, at least one of the TX processor 316 or 368, the RX processor 356 or 370, and the controller/processor 359 or 375 may be configured to perform aspects in connection with the multiple TRP component 198 of FIG. 1.

Figure 4B:
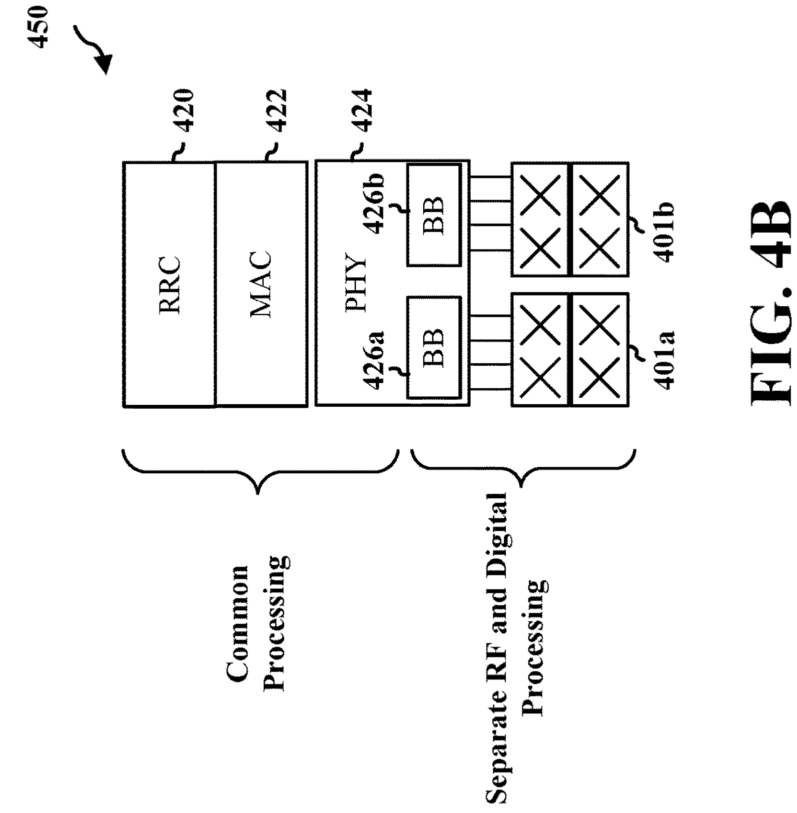
FIG. 4B is a diagram illustrating the common processing and the separate processing for multiple TRPs of a sidelink device.
Figure 4A:
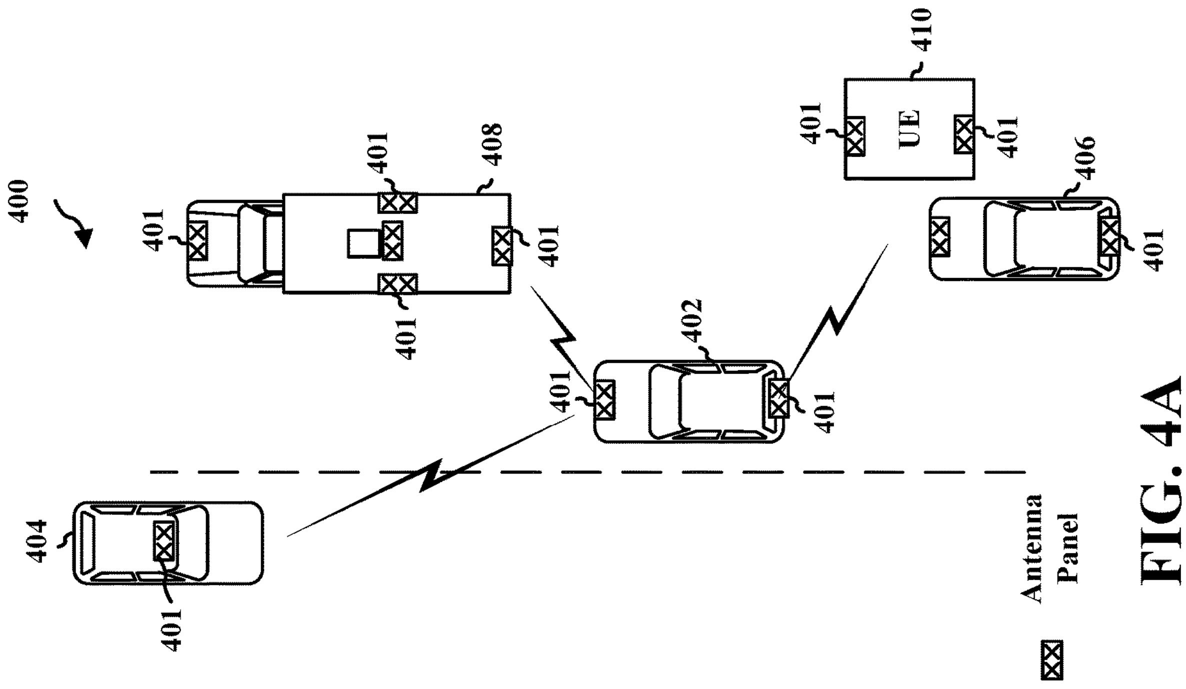
FIG. 4A is a diagram illustrating examples of sidelink devices having multiple TRPs.

A sidelink device may include multiple TRPs. For example, a vehicle may have multiple antenna panels, such as a front antenna panel and a rear antenna panel. Larger vehicles may have more than two TRPs. FIG. 4A is a diagram 400 showing an example with UEs 402, 406, and 410 having two TRPs 401, e.g., a front antenna panel and a rear antenna panel FIG. 4A also illustrates a UE 408 associated a larger vehicle having more than two TRPs 401, as well as a UE 404 having a single TRP 401. Although examples are provided for vehicular sidelink communication to illustrate the concept, the aspects presented here are applicable to non-vehicular sidelink devices and are not limited to a vehicle application. For example, the UE 410 may be a non-vehicular UE.

Each TRP includes different RF modules having a shared hardware and/or software controller. FIG. 4B illustrates a diagram 450 showing the processing at the RRC layer 420, MAC layer 422, and part of the PHY layer 424 for multiple TRPs 401*a* and 401*b* that is common to both TRP 401*a* and TRP 401*b*. FIG. 4B illustrates that each TRP may have separate RF and digital processing. Each TRP may perform separate baseband processing 426*a* and 426*b*. Each TRP may include a different antenna panel or a different set of antenna elements (e.g., 401*a* and 401*b*) of a sidelink device. The TRPs of the sidelink device may be physically separated. For example, TRPs on a vehicle may be located at different locations of the vehicle. As an example, front and rear antenna panels on a vehicle may be separated by 3 meters, 4 meters, etc. The spacing between TRPs may vary based on the size of a vehicle and/or the number of TRPs associated with the vehicle. Each of the TRPs may experience a channel differently (e.g., experience a different channel quality) due to the difference in physical location, the distance between the TRPs, different line-of-sight (LOS) characteristics (e.g., a LOS channel in comparison to a non-LOS (NLOS) channel), blocking/obstructions, interference from other transmissions, among other reasons.

A sidelink device may schedule sidelink communication per TRP 401. As an example, a UE may schedule a V2X transmission for transmission from a particular TRP of a vehicle. In some examples, the sidelink device may be capable of concurrent communication via the multiple TRPs, e.g., communication via different TRPs that overlaps in time. For example, the UE 402 may transmit a first transmission (e.g., a first sidelink TB) via the front TRP 401 that overlaps in time, at least partially, with a second transmission (e.g., a second sidelink TB) via the rear TRP 401. The concurrent transmissions of the two TBs may be in the same resources or overlapping resources. In other examples, a sidelink device may transmit a particular TB using one TRP or a subset of a larger group of TRPs. For example, the UE 408 is illustrated as having five TRPs 401 and may transmit a TB using a single TRP. Alternately, the UE 408 may transmit a TB using a subset of the five TRPs, e.g., two, three, or four TRPs.

A sidelink device, such as a UE, may autonomously determine resources for sidelink transmissions by sensing, or monitoring, for reservations of other sidelink devices. The autonomous resource selection may be referred to as "resource allocation mode 2," a "decentralized" resource allocation mode, or a sensing based sidelink resource allocation mode, e.g., where each sidelink device selects its own sidelink resources for sidelink transmissions. In contrast to a centralized resource allocation mode (e.g., resource allocation mode 1) in which a network entity may assign sidelink resources, in the decentralized sidelink resource allocation mode, a UE may autonomously select sidelink transmission resources based on a sensing and resource reservation procedure.

When a sidelink device, such as a UE, is preparing to transmit data, the sidelink device may select transmission resources from a candidate resource set from which previously reserved resources are excluded. In order to maintain the candidate resource set, the sidelink device may monitor for resource reservations from other sidelink devices. For example, the sidelink device may receive SCI from other UEs including reservation information in a resource reservation field. The number of resources (e.g., sub-channels per subframe) reserved by a UE may depend on the size of data to be transmitted by the UE. Although the example is described for a UE receiving reservations from another UE, the reservations may also be received from an RSU or other device communicating based on sidelink. The sidelink device may exclude resources that are used and/or reserved by the other UEs from a candidate resource set. The exclusion of the reserved resources enables the UE to select/reserve resources for a transmission from the resources that are unused/unreserved. Although the example is described for a UE receiving reservations from another UE, the reservations may also be received from an RSU or other device communicating based on sidelink.

Figure 5:
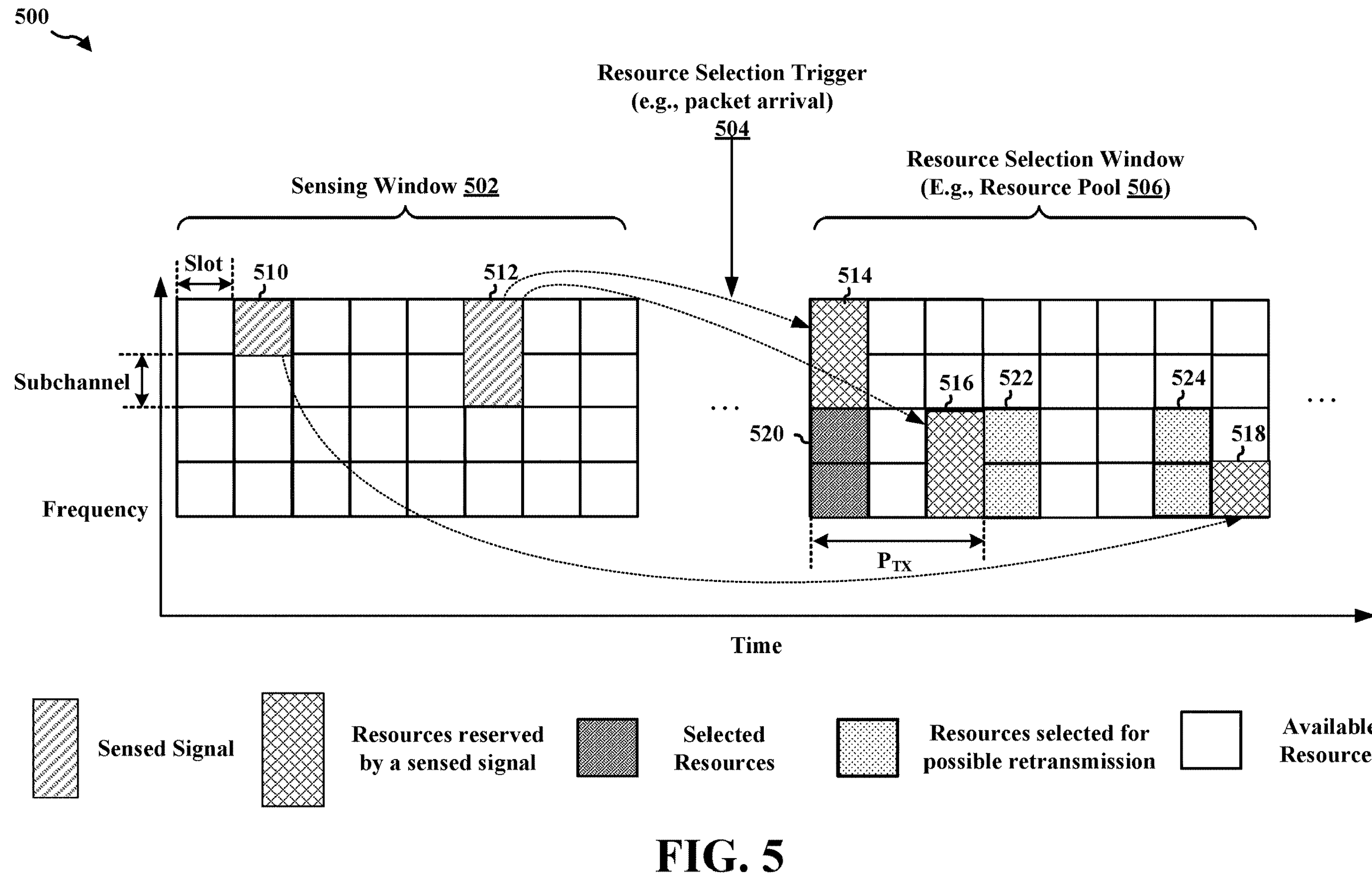
FIG. 5 illustrates an example of a sensing and reservation procedure for sidelink resource communication.

FIG. 5 is a diagram showing time frequency resources for sidelink sensing and resource selection, e.g., mode 2 resource allocation. FIG. 5 shows reservations 510 and 512 for sidelink transmissions. The resource reservations for each UE may be in units of one or more sub-channels in the frequency domain (e.g., sub-channels 1 to 4), and may be based on one slot in the time domain. A UE may use resources in a first slot to perform an initial transmission, and may reserve resources in one or more future slots, e.g., for retransmissions. In some examples, up to two different future slots may be reserved by a particular UE for retransmissions. The reserved resource may be used for a retransmission of a packet or for transmission of a different packet. For example, the reservation may be for two retransmissions or for more than two retransmissions. The reservation may be for an initial transmission and a single transmission. The reservation may be for an initial transmission. The resource reservation may be chained, e.g., with a transmission A indicating a resource for transmission B. Transmission B may then indicate a resource for transmission C, and transmission C may indicate a resource for transmission D. The pattern may continue with transmission D indicating future resources. In another example, transmission A may indicate resources for transmissions B and C. Then, transmission B may indicate resources for transmissions C and D. The pattern may continue with transmission D indicating future resources.

A sidelink device may identify available resources in a future resource selection window 506 by monitoring for resource reservations during a sensing window 502. The sensing window may be based on a range of slots and sub-channels. FIG. 5 illustrates an example sensing window including 8 consecutive time slots and 4 consecutive sub-channels, which spans 32 resource blocks. The sidelink device may monitor resources of a sidelink resource pool, over the slots of the sensing window. FIG. 5 illustrates that sidelink transmission 510 indicates a resource reservation for resource 518, and sidelink transmission 512 indicates a resource reservation for resources 514 and 522. For example, the sidelink transmissions 510 and 512 may each include SCI that indicates the corresponding resource reservation.

A sidelink device receiving the transmissions 510 and 512 may exclude the resources 514, 516, and 518 as candidate resources in a candidate resource set based on the resource selection window 506. In some examples, the sidelink device may exclude the resources 514, 516, or 518 based on whether a measured RSRP for the received SCI (e.g., in 510 or 512) meets a threshold. When a resource selection trigger occurs at 504, such as the sidelink device having a packet for sidelink transmission, the sidelink device may select resources for the sidelink transmission (e.g., including PSCCH and/or PSSCH) from the remaining resources of the resource pool within the resource selection window 506 after the exclusion of the reserved resources (e.g., 514, 516, and 518). FIG. 5 illustrates an example in which the sidelink device selects the resource 520 for sidelink transmission. The sidelink device may also select resources 522 and/or 524 for a possible retransmission. After selecting the resources for transmission, the sidelink device may transmit SCI indicating a reservation of the selected resources. Thus, each sidelink device may use the sensing/reservation procedure to select resources for sidelink transmissions from the available candidate resources that have not been reserved by other sidelink devices.

A sidelink device may support full-duplex sidelink communication via multiple TRPs. For example, the UE 402 in FIG. 4A may transmit a sidelink transmission via the front antenna panel at an overlapping time with reception of sidelink communication via the rear antenna panel.

Full duplex operation in which a wireless device concurrently transmits and receives communication that overlaps in time may enable more efficient use of the wireless spectrum. Full duplex operation may include simultaneous transmission and reception in a same frequency range, or partially overlapped frequency range, or separate frequency ranges.

For example, a UE, or other sidelink device, may transmit communication from one antenna panel and may receive communication with another antenna panel. For example, the sidelink device may transmit from one TRP concurrently with reception at another TRP. As an example, the UE may transmit a sidelink transmission from a TRP at the front of a vehicle and may concurrently receive via a TRP at the rear of the vehicle. As another example, the sidelink device may perform full-duplex communication from the same antenna panel. For example, the sidelink device may receive sidelink communication using a first set of one or more antenna elements within the antenna panel while concurrently using a second set of one or more antenna elements of the antenna panel to transmit a sidelink transmission. In some examples, the full duplex communication may be conditional on beam or spatial separation or other conditions. Full duplex communication may reduce latency. Full duplex communication may improve spectrum efficiency, e.g., spectrum efficiency per UE, with respect to the spectral efficiency of half-duplex communication that supports transmission or reception of information in one direction at a time without overlapping uplink and downlink communication. Full duplex communication may enable more efficient use of wireless resources.

Figure 6B:
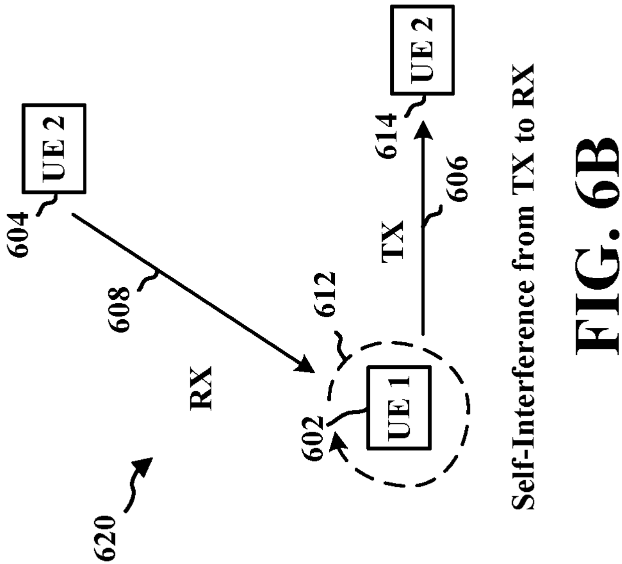
FIGS. 6A and 6B illustrate examples of full-duplex communication.
Figure 6A:
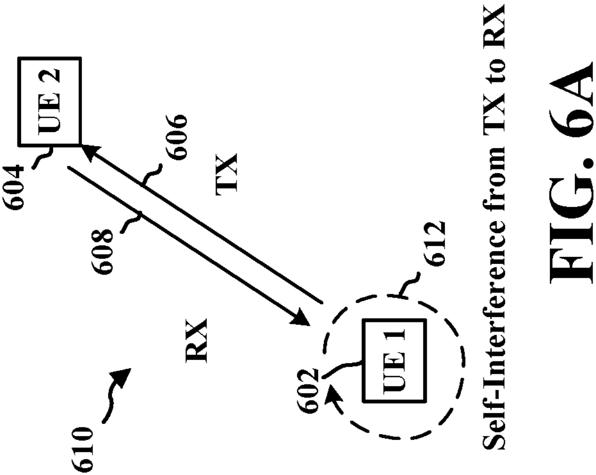

Due to the simultaneous Tx/Rx nature of full duplex communication, a sidelink device may experience self-interference caused by signal leakage from its transmitting TRP to its receiving TRP or from a transmitting set of one or more antenna elements to a receiving set of one or more antenna elements. In addition, the sidelink device may also experience interference from other devices, such as transmissions from a second sidelink device. Such interference (e.g., self-interference or interference caused by other devices) may impact the quality of the communication, or even lead to a loss of information. FIG. 6A illustrates an example of full-duplex communication 610 in which a UE 602 concurrently transmits and receives communication with a second UE 604. FIG. 6A illustrates that the transmission of signal 606 from UE 602 may cause interference 612 to the reception of the signal 608 from the second UE 604. FIG. 6B illustrates an example of full-duplex communication 620 in which the UE 602 transmits a signal 606 to the UE 614 concurrently with reception of a signal 608 from the UE 604. Similar to the example in FIG. 6A, FIG. 6B illustrates that the transmission of the signal 606 may be received by the receiving TRP or receiving antenna elements and cause self-interference 612 to the concurrent reception of the signal 608.

Figure 7:
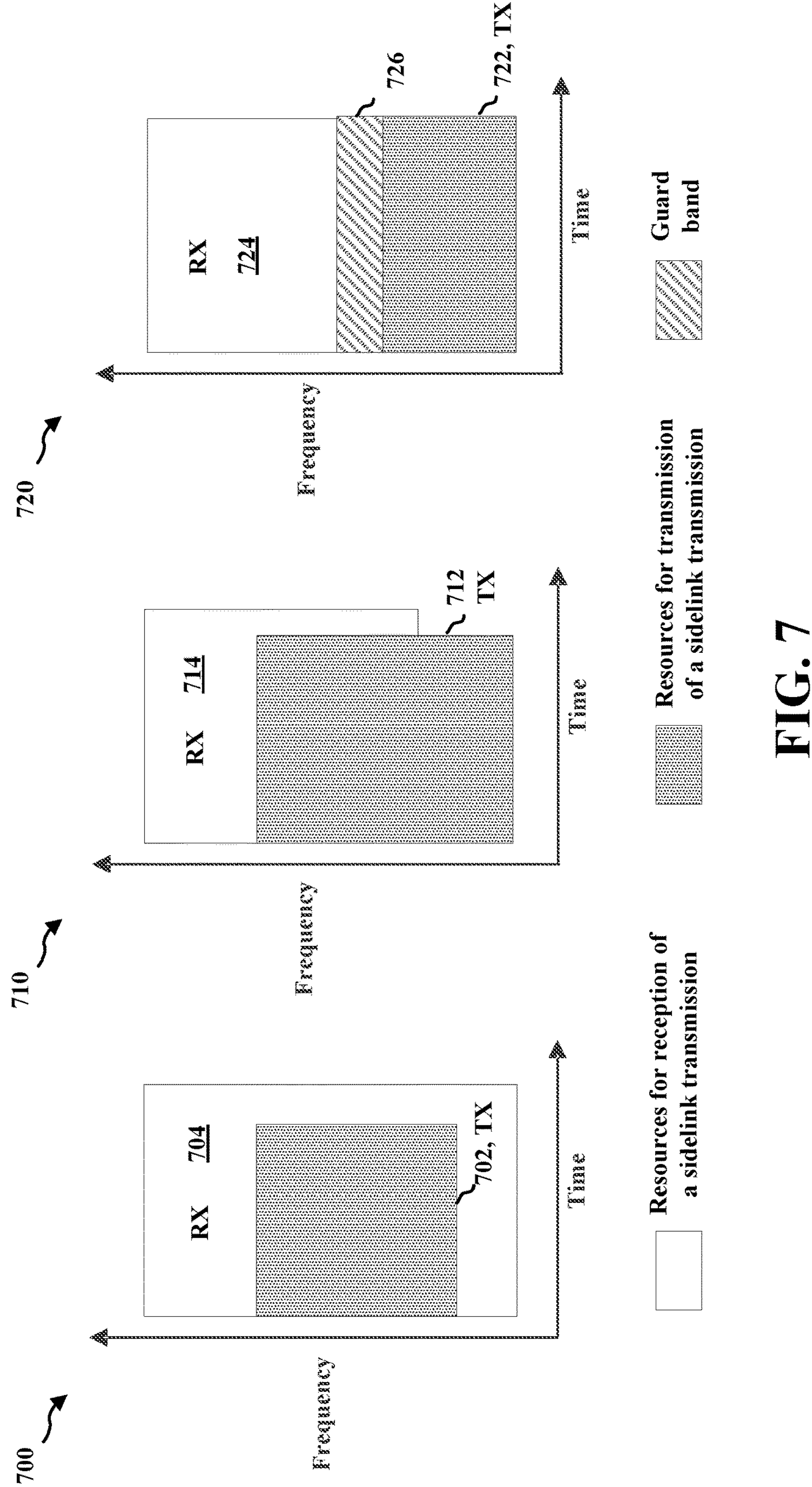
FIG. 7 illustrates examples of in-band full duplex (IBFD) resources and sub-band frequency division duplex (FDD) resources for full duplex communication.

Full duplex communication may be in a same frequency band. The transmitted and received communication may be in different frequency subbands, in the same frequency subband, or in partially overlapping frequency subbands. FIG. 7 illustrate a first example 700 and a second example 710 of in-band full duplex (IBFD) resources (which may also be referred to as single-frequency full-duplex) and a third example 720 of sub-band full-duplex resources. In IBFD, signals may be transmitted and received in overlapping times and overlapping in frequency. As shown in the first example 700, a time and a frequency allocation of transmission resources 702 may fully overlap with a time and a frequency allocation of reception resources 704. In the second example 710, a time and a frequency allocation of transmission resources 712 may partially overlap with a time and a frequency of allocation of reception resources 714.

IBFD is in contrast to sub-band frequency division duplex (FDD), where transmission and reception resources may overlap in time using different frequencies, as shown in the third example 720. In the third example 720, the transmission resources 722 are separated from the reception resources 724 by a guard band 726. The guard band may be frequency resources, or a gap in frequency resources, provided between the transmission resources 722 and the reception resources 724. Separating the frequency resources for transmission and reception with a guard band may help to reduce self-interference. Transmission and reception resources that are immediately adjacent to each other may be considered as having a guard band width of 0. As an output signal, e.g., from a UE transmitter may extend outside the transmission resources, the guard band may reduce interference experienced by the UE. Sub-band FDD may also be referred to as "flexible duplex".

As described above, performance of full-duplex communications may be affected or limited by self-interference between the transmit RF chain and the receive RF chain within the same device. In IBFD, the transmitted signal may directly interfere with the signal reception at a same UE as the transmission and the reception occur in the same frequency subband or in partially overlapping frequency subbands. In sub-band FDD, the leakage of the transmitted signal into adjacent frequencies may interfere with the signal reception at the same UE in those frequencies. The interference may be more pronounced where the guard band is insufficiently wide. Accordingly, the SIM may play an important role in full-duplex communications. In particular, the SIM may initially indicate whether full-duplex operation is feasible. Further, the SIM may assist in the signal reception in full-duplex communications as the information gathered through the SIM may be used for, e.g., self-interference coordination, self-interference cancellation, and other purposes.

Figure 8:
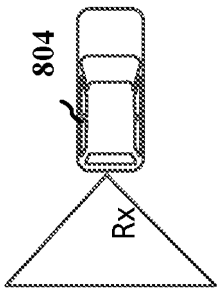
FIG. 8 is a diagram illustrating an example environment in which aspects may be practiced.
Figure 8:
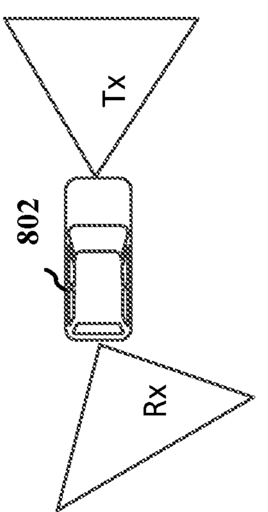
Figure 8:
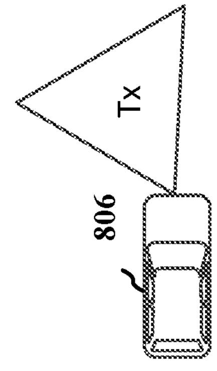
Figure 8:

Aspects of the disclosure relate to the SIM and self-interference management in full-duplex sidelink communications, and in particular, to mode 2 (e.g., autonomous or distributed) resource allocation in full-duplex sidelink communications. FIG. 8 is a diagram illustrating an example environment 800 in which aspects may be practiced. The UE 802 may concurrently perform sidelink transmission and sidelink reception. In other words, the UE 802 may perform full-duplex sidelink communication or may operate in a full-duplex mode. FIG. 8 illustrates that the UE 802 may concurrently transmit messages to the UE 804 and receive messages from the UE 806. FIG. 8 does not limit the disclosure. In other aspects, the UE 802 may transmit messages to and receive messages from the UE or different UEs in overlapping times. As well, the UE may communicate using more than two TRPs or TRPs in different locations than those illustrated in FIG. 8.

Figure 9:
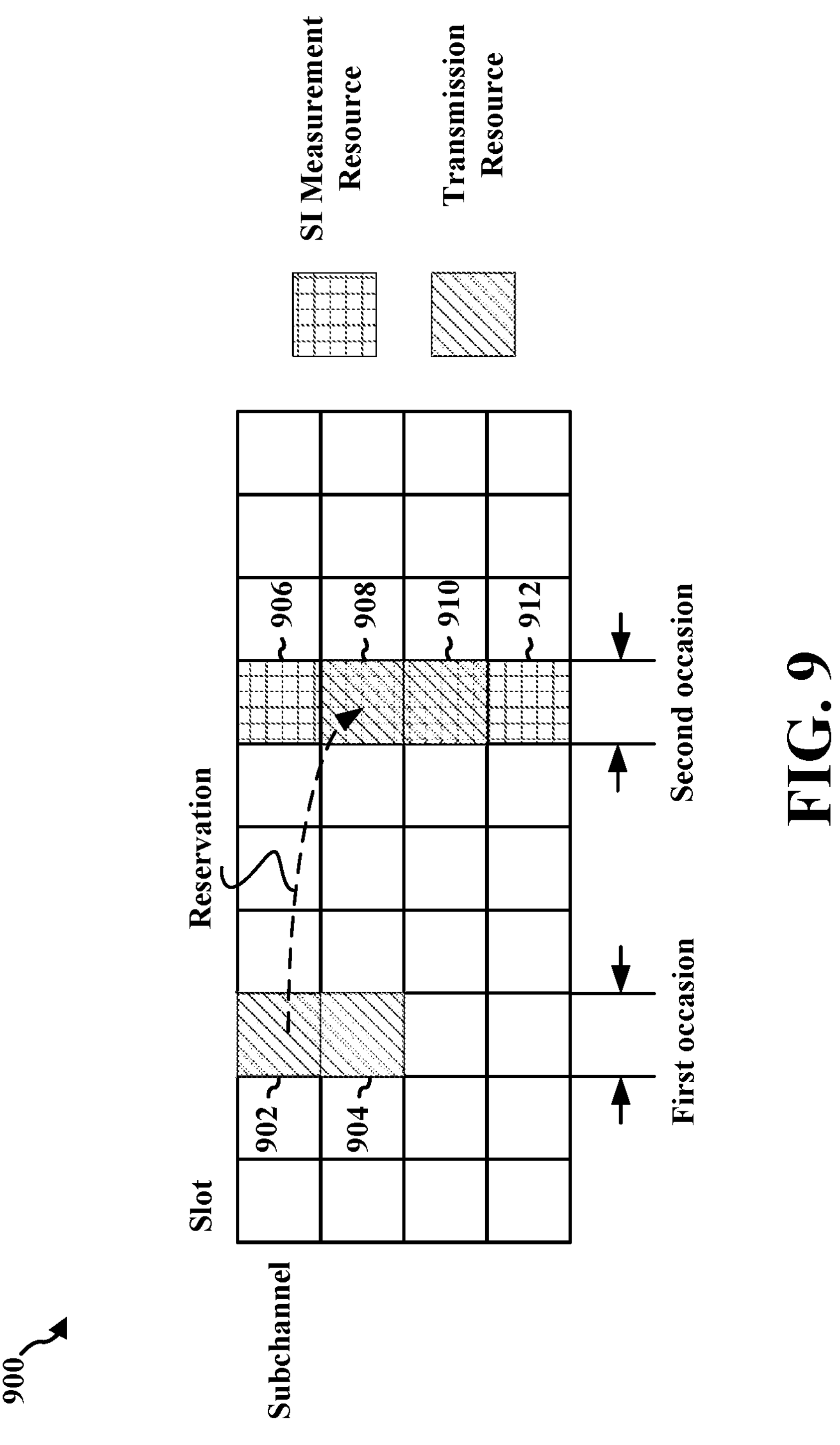
FIG. 9 is a diagram illustrating example resource usage according to one aspect.

FIG. 9 is a diagram 900 illustrating example resource usage according to one aspect A full-duplex UE (e.g., the UE 802) may perform the SIM as follows. The UE may transmit a first transmission in a first transmission occasion (e.g., a first slot) (e.g., using resource blocks 902, 904). The first transmission may include at least sidelink control signaling (e.g., a sidelink control information "SCI" message), which may indicate or imply an SIM configuration for a second transmission occasion (e.g., a second slot). In particular, the sidelink control signaling may indicate a resource reservation for the SIM for the second transmission occasion. FIG. 9 illustrates the resource reservation of resource blocks 906, 908, 910, 912 for the SIM for the second transmission occasion. Other UEs (e.g., the UE 804 in FIG. 8) receiving the sidelink control signaling in the first occasion may exclude the reserved resources in the second occasion from the candidate resources when selecting resources for their sidelink transmissions. The UE may transmit a signal in the second transmission occasion (e.g., using resource blocks 908, 910), and may measure the self-interference (i.e., perform the SIM) (e.g., over resource blocks 906, 908, 910, 912) in the second transmission occasion, using different TRPs or different antenna elements within a TRP. In some aspects, the resources indicated for the reservation may be different than the resources that the UE will use for the second transmission (e.g., for the transmission of the signal for SIM). For example, the UE may indicate resources that are adjacent to the resources that the UE intends to use so that the UE indicates a wider bandwidth than the actual bandwidth of the SIM transmission signal. FIG. 9 illustrates that the UE may reserve SIM resources that have a wider frequency than the actual transmission resources that the UE uses to transmit the signal for SIM. In some aspects, the UE may indicate all of the frequency resources in the second transmission occasion as being reserved (e.g., the frequency resources spanning a sidelink resources pool in which the signal will be transmitted, etc.), whereas the UE may transmit the SIM signal using only a part of the frequency resources of the sidelink resource pool. The UE may then perform full-duplex operations based at least on the SIM.

Figure 10B:
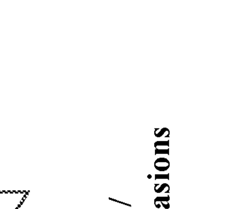
FIGS. 10A and 10B are diagrams illustrating the transmission and reception at the UE in different transmission occasions according to different aspects.
Figure 10B:
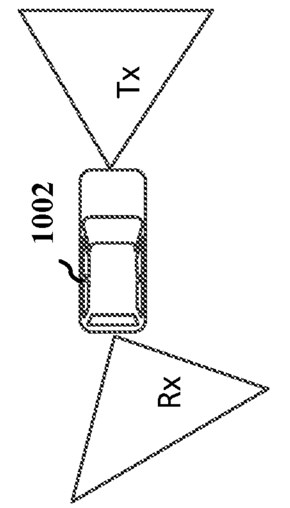
Figure 10A:
Figure 10A:
Figure 10A:
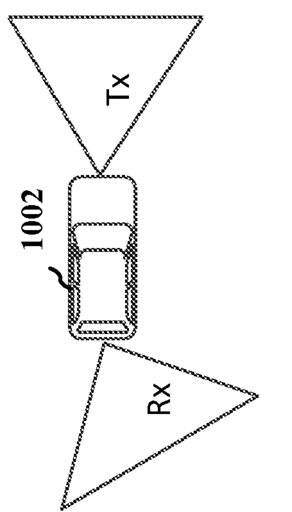

FIGS. 10A and 10B are diagrams 1000A, 1000B illustrating the transmission and reception at the UE in different transmission occasions according to different aspects. The UE 1002 may correspond to the UE 802 in FIG. 8. In one aspect, according to one set of configurations, as illustrated in FIG. 10A, the UE 1002 may transmit sidelink control signaling (e.g., in a first message) in the first transmission occasion. The sidelink control signaling may indicate a resource reservation. In one aspect, the resource reservation may correspond directly to the resources that the UE 1002 will use to transmit signals in the second transmission occasion. For example, in FIG. 9, the UE (e.g., the UE 802/1002) may transmit signals using resource blocks 908, 910 in the second transmission occasion, and the resource reservation indicated in the sidelink control signaling may be for the resource blocks 908, 910.

In another aspect, the resource reservation may not be for exactly the resources that may be used by the UE 1002 to transmit signals in the second transmission occasion. For example, in addition to the resources that may be used by the UE 1002 to transmit signals in the second transmission occasion, the resource reservation may also indicate resources that are adjacent to the resources that may be used by the UE 1002 to transmit signals in the second transmission occasion. Referring back to FIG. 9, the resource reservation indicated in the sidelink control signaling may be for the resource blocks 908, 910 (i.e., the resources that may be used by the UE to transmit signals in the second transmission occasion) as well as for the resource blocks 906, 912 (i.e., the resources that are adjacent to the resources that may be used by the UE to transmit signals in the second transmission occasion). In another example, the resource reservation may be for all the resources (e.g., the entire bandwidth for sidelink communications, the entire bandwidth of a sidelink resource pool, etc.) in the second transmission occasion. In other words, all frequency resources in the second transmission occasion may be indicated as reserved, although the UE may transmit signals in the second transmission occasion using only some of the reserved resources. Referring back to FIG. 9, the resource reservation indicated in the sidelink control signaling may be for all the resource blocks 906, 908, 910, 912 in the second occasion. Accordingly, other UEs (e.g., the UE 804 in FIG. 8) that receive the sidelink control signaling in the first occasion may exclude the reserved resources from the candidate resources when transmitting in the second occasion.

In the second transmission occasion, as illustrated in FIG. 10A, the UE 1002 may transmit a signal using some of the reserved resources (e.g., resource blocks 908, 910 in FIG. 9), and may measure the self-interference in the resources indicated in the sidelink control signaling as being reserved (e.g., resource blocks 906, 908, 910, 912 in FIG. 9). The self-interference may be measure using a different TRP than the TRP used for transmitting the signal in the second transmission occasion.

The sidelink control signaling transmitted by the UE 1002 in the first transmission occasion may also indicate a first beam direction for the signal transmission in the second transmission occasion. In particular, the first beam direction may be indicated or implied in a transmission configuration indicator (TCI) state carried by the sidelink control signaling.

In the second transmission occasion, the UE 1002 may perform the SIM in a second beam direction. For example, the UE 1002 may transmit a signal using a first TRP (or (a) first antenna element(s)) in the first beam direction, and may concurrently receive the signal using a second TRP (or (a) second antenna element(s)) in the second beam direction for the SIM.

The UE 1002 may transmit the sidelink control signaling in the first transmission occasion using a wider beam than the transmission beam (i.e., the first beam) used in the second transmission occasion. The wider beam may increase the likelihood that other UEs (e.g., the UE 804 in FIG. 8) in the vicinity may receive the sidelink control signaling and the resource reservation indicated therein. The other UEs that receive the indicated resource reservation may exclude the reserved resources from candidate resources during their own transmissions in the second transmission occasion. Accordingly, more nearby UEs may avoid interfering with the SIM at the UE 1002 in the second transmission occasion.

In another aspect, according to one set of configurations, as illustrated in FIG. 10B, the UE 1002 may similarly transmit sidelink control signaling in the first transmission occasion. Further, the UE 1002 may transmit an additional transmission (e.g., a second message) in the second beam direction (i.e., the beam direction in which the SIM may be performed by the UE 1002 in the second transmission occasion). The additional transmission may take place in the first transmission occasion or in a different transmission occasion (e.g., a third transmission occasion between the first transmission occasion and the second transmission occasion). The additional transmission may indicate or imply the second beam direction in which the SIM may be performed in the second transmission occasion. Accordingly, the additional transmission may indicate or imply a reservation of the second beam direction in the second transmission occasion, so that other UEs (e.g., the UE 804) that receive the additional transmission may avoid transmitting in the second beam direction in the second transmission occasion (or may avoid transmitting in the second transmission occasion altogether). As a result, interference to the SIM by the other UEs may be reduced or eliminated, and the SIM performance may be improved.

The sidelink control signaling transmitted by the UE 1002 in the first transmission occasion may also indicate the first beam direction (i.e., the beam direction in which the signal is transmitted by the UE 1002 in the second transmission occasion for the SIM). The first beam direction may be indicated or implied in a TCI state carried by the sidelink control signaling. The information about the first beam direction may be useful to the UEs that are receiving from the UE 1002.

In another aspect, according to one set of configurations, as illustrated in FIG. 10A, the UE 1002 may similarly transmit sidelink control signaling in the first transmission occasion. The sidelink control signaling may further indicate the second beam direction (i.e., the beam direction in which the SIM may be performed by the UE 1002 in the second transmission occasion). In particular, the second beam direction may be indicated or implied in a TCI state carried by the sidelink control signaling. Other UEs (e.g., the UE 804) that receive the sidelink control signaling including the indicated second beam direction may avoid transmitting in the second beam direction in the second transmission occasion (or may avoid transmitting in the second transmission occasion altogether). As a result, interference to the SIM by the other UEs may be reduced or eliminated, and the SIM performance may be improved.

The sidelink control signaling transmitted by the UE 1002 in the first transmission occasion may also indicate the first beam direction (i.e., the beam direction in which the signal is transmitted by the UE 1002 in the second transmission occasion for the SIM). The first beam direction may be indicated or implied in a TCI state carried by the sidelink control signaling. The information about the first beam direction may be useful to the UEs that are receiving from the UE 1002.

In different aspects, the SIM may be subband-based or single frequency-based. In the subband-based SIM, whose result may be used for sub-band FDD, the self-interference may be measured in frequencies that are different from the frequencies in which the signal for the SIM is transmitted. In the single frequency-based SIM, whose result may be used for IBFD, the self-interference may be measured in the entire frequency range (e.g., the entire bandwidth for sidelink communications), or in the same frequencies in which the signal for the SIM is transmitted.

In one aspect, the SIM may be based on the reference signal received power (RSRP) measured at the receiver branch (e.g., the first TRP or the first antenna element(s)) of the UE, where the reference signal may have been transmitted via the transmitter branch (e.g., the second TRP or the second antenna element(s)) of the UE. In another aspect, the SIM may be based on the received signal strength indicator (RSSI) measured at the receiver branch (e.g., the first TRP or the first antenna element(s)) of the UE. The RSSI at a frequency adjacent to the frequency at which the signal is transmitted may indicate leakage across frequencies. Accordingly, the RSSI measurement may be used in the subband-based SIM.

Figure 11:
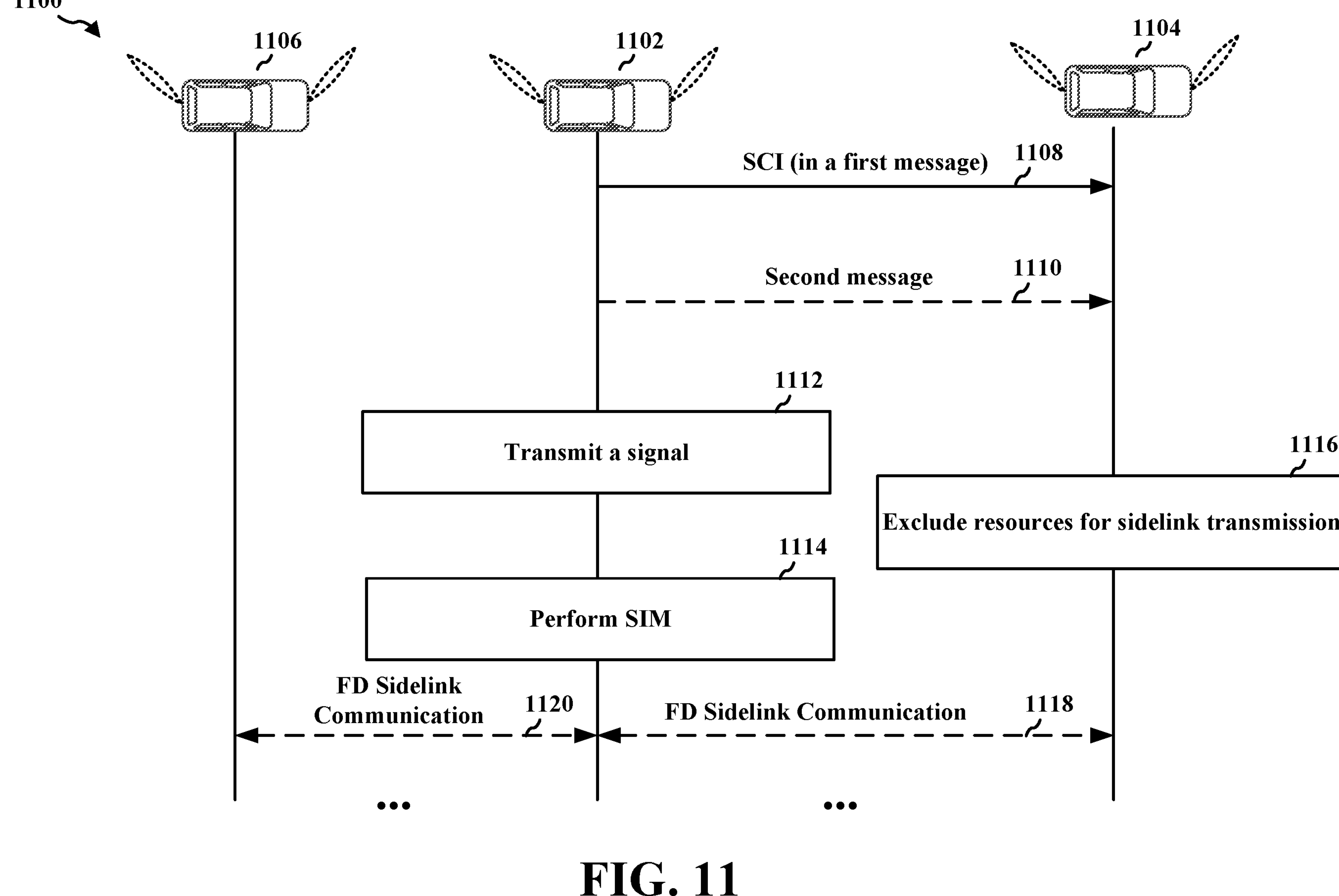
FIG. 11 is a diagram illustrating an example communication flow according to aspects.

FIG. 11 is a diagram illustrating an example communication flow 1100 according to aspects. In a first transmission occasion (e.g., a first slot), at 1108, the UE 1102 (which may correspond to UE 802/1002) may transmit to the UE 1104 (which may correspond to the UE 804), and the UE 1104 may receive from the UE 1102, SCI indicating a resource reservation for a SIM in a second transmission occasion (e.g., a second slot). In the second transmission occasion, at 1112, the UE 1102 may transmit a signal. Concurrently, at 1114, the UE 1102 may perform the SIM based on the signal using at least a portion of resources indicated in the resource reservation. Also, concurrently in the second transmission occasion, the UE 1104 may exclude resources indicated in the resource reservation from candidate resources for a sidelink transmission by the UE 1104. Subsequently, at 1118 and/or 1120, the UE 1102 may perform full-duplex communication with one or both of the UE 1104 and the UE 1106 (which may correspond to the UE 806) based at least in part on the result of the SIM. For example, self-interference coordination and/or self-interference cancellation may be performed based on the result of the SIM to facilitate the full-duplex communication.

In one aspect, the resource reservation included in the SCI may correspond directly to the resources used by the UE 1102 to transmit the signal in the second transmission occasion at 1112. For example, in FIG. 9, the UE (e.g., the UE 802/1002/1102) may transmit signals using resource blocks 908, 910 in the second transmission occasion, and the resource reservation indicated in the SCI may be for the resource blocks 908, 910.

In another aspect, the resource reservation may indicate different (e.g., wider frequency) resources than those used by the UE 1102 to transmit the signal in the second transmission occasion at 1112. For example, in addition to the resources that may be used by the UE 1102 to transmit the signals in the second transmission occasion at 1112, the resource reservation may also indicate frequency resources that are adjacent to the resources that may be used by the UE 1102 to transmit the signal in the second transmission occasion at 1112. Referring back to FIG. 9, the resource reservation indicated in the SCI may be for the resource blocks 908, 910 (i.e., the resources that may be used by the UE to transmit signals in the second transmission occasion at 1112) as well as for the resource blocks 906, 912 (i.e., the resources that are adjacent to the resources that may be used by the UE to transmit signals in the second transmission occasion at 1112). In another example, the resource reservation may be for all the frequency resources (e.g., the entire bandwidth for sidelink communications, the entire bandwidth of a sidelink resource pool, etc.) in a particular frequency range associated with in the second transmission occasion. In other words, all frequency resources in the second transmission occasion may be indicated as reserved, although the UE 1102 may transmit the signal in the second transmission occasion at 1112 using only some of the reserved resources. Referring back to FIG. 9, the resource reservation indicated in the SCI may be for all the resource blocks 906, 908, 910, 912 in the second occasion. Accordingly, other UEs (e.g., the UE 1104) that receive the SCI in the first occasion at 1108 may exclude the reserved resources from the candidate resources at 1116 when transmitting in the second occasion.

In the second transmission occasion, the UE 1102 may transmit a signal, at 1112, using some of the reserved resources (e.g., resource blocks 908, 910 in FIG. 9), and may measure the self-interference, at 1114, in the resources indicated in the SCI as being reserved (e.g., resource blocks 906, 908, 910, 912 in FIG. 9). The self-interference may be measured using a different TRP (antenna element(s)) than the TRP (antenna element(s)) used for transmitting the signal in the second transmission occasion.

The SCI transmitted by the UE 1102 in the first transmission occasion at 1108 may also indicate a first beam direction for the signal transmission at 1112 in the second transmission occasion. In particular, the first beam direction may be indicated or implied in a TCI state carried by the SCI.

In the second transmission occasion, the UE 1102 may perform the SIM in a second beam direction at 1114. For example, the UE 1102 may transmit a signal using a first TRP (or (a) first antenna element(s)) in the first beam direction at 1112, and may concurrently receive the signal using a second TRP (or (a) second antenna element(s)) in the second beam direction for the SIM at 1114.

The UE 1002 may transmit the SCI in the first transmission occasion at 1108 using a wider beam than the transmission beam (i.e., the first beam) used in the second transmission occasion at 1112. The wider beam may increase the likelihood that more UEs (e.g., the UE 1104) in the vicinity may receive the SCI and the resource reservation indicated therein. The other UEs that receive the indicated resource reservation may exclude the reserved resources from candidate resources at 1116 during their own transmissions in the second transmission occasion. Accordingly, more nearby UEs may avoid interfering with the SIM at the UE 1102 in the second transmission occasion at 1114.

In another aspect, at 1110, the UE 1102 may transmit an additional transmission (e.g., a second message) in the second beam direction (i.e., the beam direction in which the SIM may be performed by the UE 1102 in the second transmission occasion at 1114). The additional transmission at 1110 may take place in the first transmission occasion or in a different transmission occasion (e.g., a third transmission occasion between the first transmission occasion and the second transmission occasion). The additional transmission may indicate or imply the second beam direction in which the SIM may be performed in the second transmission occasion at 1114. Accordingly, the additional transmission at 1110 may indicate or imply a reservation of the second beam direction in the second transmission occasion, so that other UEs (e.g., the UE 1104) that receive the additional transmission may avoid transmitting in the second beam direction in the second transmission occasion (or may avoid transmitting in the second transmission occasion altogether) at 1116. As a result, interference to the SIM by the other UEs may be reduced or eliminated, and the SIM performance may be improved.

The SCI transmitted by the UE 1102 in the first transmission occasion may also indicate the first beam direction (i.e., the beam direction in which the signal is transmitted by the UE 1102 in the second transmission occasion at 1112 for the SIM). The first beam direction may be indicated or implied in a TCI state carried by the SCI. The information about the first beam direction may be useful to the UEs that are receiving from the UE 1102.

In another aspect, the SCI may further indicate the second beam direction (i.e., the beam direction in which the SIM may be performed by the UE 1102 in the second transmission occasion at 1114). In particular, the second beam direction may be indicated or implied in a TCI state carried by the SCI. Other UEs (e.g., the UE 1104) that receive the SCI including the indicated second beam direction may avoid transmitting in the second beam direction in the second transmission occasion (or may avoid transmitting in the second transmission occasion altogether). As a result, interference to the SIM by the other UEs may be reduced or eliminated, and the SIM performance may be improved.

In different aspects, the SIM may be subband-based or single frequency-based. In the subband-based SIM, whose result may be used for sub-band FDD, the self-interference may be measured at 1114 in frequencies that are different from the frequencies in which the signal for the SIM is transmitted at 1112. In the single frequency-based SIM, whose result may be used for IBFD, the self-interference may be measured at 1114 in the entire frequency range (e.g., the entire bandwidth for sidelink communications), or in the same frequencies in which the signal for the SIM is transmitted at 1112.

In one aspect, the SIM may be based on the reference signal received power (RSRP) measured at the receiver branch (e.g., the first TRP or the first antenna element(s)) of the UE 1102, where the reference signal may have been transmitted via the transmitter branch (e.g., the second TRP or the second antenna element(s)) of the UE 1102. In another aspect, the SIM may be based on the received signal strength indicator (RSSI) measured at the receiver branch (e.g., the first TRP or the first antenna element(s)) of the UE 1102. The RSSI measured at 1114 at a frequency adjacent to the frequency at which the signal is transmitted at 1112 may indicate signal leakage across frequencies. Accordingly, the RSSI measurement may be used in the subband-based SIM.

Figure 12:
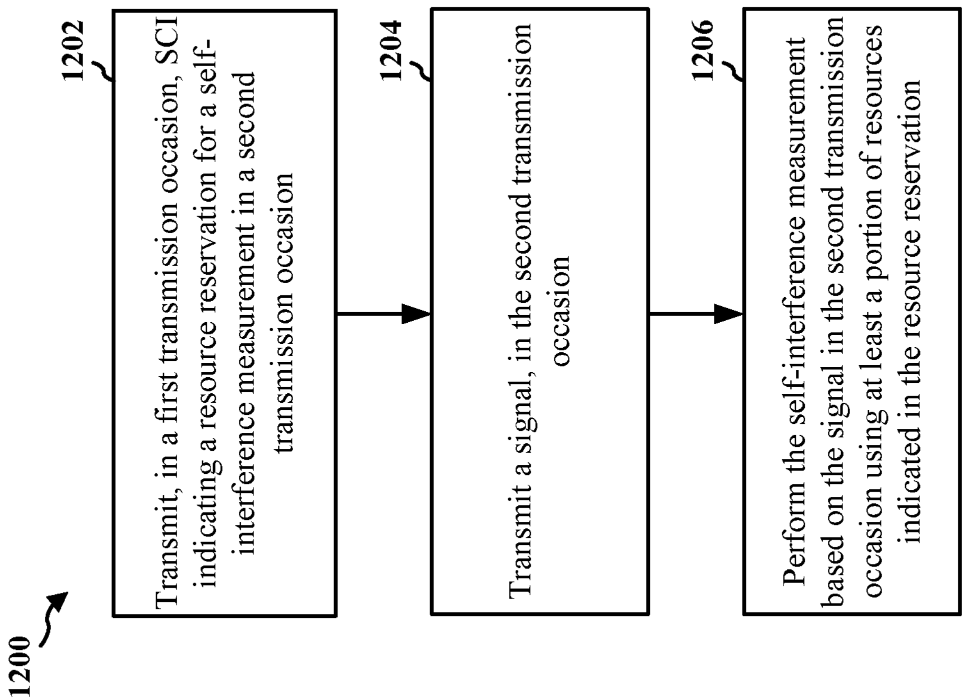
FIG. 12 is a flowchart of a method of wireless communication.

FIG. 12 is a flowchart 1200 of a method of wireless communication. The method may be performed by a sidelink device, such as a UE, an RSU, etc. For example, the method may be performed by the UE 104; the UE 802; the UE 1002; the UE 1102; the apparatus 1402. Optional aspects are illustrated with a dashed line. The method may improve the accuracy of the SIM whose result may be used to facilitate the full-duplex communication.

At 1202, the sidelink device may transmit, in a first transmission occasion, SCI indicating a resource reservation for a self-interference measurement in a second transmission occasion. For example, 1202 may be performed by the SCI component 1440 in FIG. 14 via the transmission component 1434. For example, 1108 in FIG. 11 illustrates the UE 1102 transmitting SCI in a first transmission occasion.

The first transmission occasion may correspond to a first slot. The second transmission occasion may correspond to a second slot. The resource reservation in the SCI may indicate the resources for transmission of the signal in the second transmission occasion. The resource reservation in the SCI may further indicate additional resources in the second transmission occasion that extend beyond the resources for the transmission of the signal. In one aspect, the resource reservation in the SCI may indicate frequency resources spanning a frequency range associated with the second transmission occasion.

At 1204, the sidelink device may transmit a signal, in the second transmission occasion. For example, 1204 may be performed by the signal component 1442 in FIG. 14 via the transmission component 1434. For example, 1112 in FIG. 11 illustrates the UE 1102 transmitting a signal in the second transmission occasion.

The sidelink device may transmit the signal in a first beam direction, and the SCI may further indicate the first beam direction. In particular, the first beam direction may be indicated by a TCI state included in the SCI. The sidelink device may transmit the SCI in the first transmission occasion on a wider beam than a first beam.

Finally, at 1206, the sidelink device may perform the self-interference measurement based on the signal in the second transmission occasion using at least a portion of resources indicated in the resource reservation. For example, 1206 may be performed by the SIM component 1444 in FIG. 14. For example, 1114 in FIG. 11 illustrates the UE 1102 performing the SIM based on the signal in the second transmission occasion.

In one aspect, the sidelink device may transmit the signal using a first TRP and may perform the self-interference measurement at a second TRP different from the first TRP. In another aspect, the sidelink device may transmit the signal using at least a first antenna element and may perform the self-interference measurement using at least a second antenna element different from the first antenna element.

The sidelink device may transmit the signal in the first beam direction, and may perform the self-interference measurement based on a second beam direction. The sidelink device may transmit the SCI in the first beam direction and the second beam direction. The sidelink device may transmit the SCI in a first message in the first beam direction and in a second message in the second beam direction. At least the second message may indicate the second beam direction associated with the self-interference measurement. The second message may reserve resources in the second beam direction for the self-interference measurement.

In one aspect, the sidelink device may transmit the second message in the first transmission occasion. In another aspect, the sidelink device may transmit the second message in a different transmission occasion than the first transmission occasion.

The SCI may include an indication of the first beam direction and the second beam direction. The second beam direction may be indicated by a TCI state included in the SCI.

In one aspect, the sidelink device may transmit the signal using first frequency resources and performs the self-interference measurement over second frequency resources that are different from the first frequency resources. In another aspect, the sidelink device may transmit the signal in a first frequency range that at least partial overlaps with a second frequency range that the sidelink device may use to perform the self-interference measurement. The second frequency range may span an entire bandwidth of a sidelink frequency pool.

In one aspect, the signal may include a reference signal, and the self-interference measurement may be based on an RSRP measurement. In another aspect, the self-interference measurement is based on an RSSI measurement of the signal.

Figure 13:
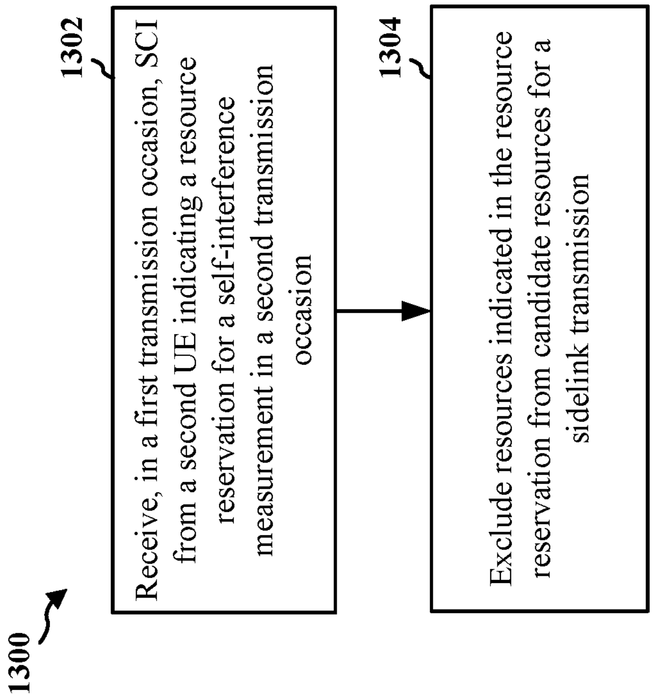
FIG. 13 is a flowchart of a method of wireless communication.

FIG. 13 is a flowchart 1300 of a method of wireless communication. The method may be performed by a sidelink device, such as a UE (e.g., a first UE), an RSU, etc. For example, the method may be performed by the UE 104; the UE 804; the UE 1104; the apparatus 1502. Optional aspects are illustrated with a dashed line. The method may improve the accuracy of the SIM whose result may be used to facilitate the full-duplex communication.

At 1302, the sidelink device (e.g., the first UE) may receive, in a first transmission occasion, SCI from a second UE indicating a resource reservation for a self-interference measurement in a second transmission occasion. For example, 1302 may be performed by the SCI component 1540 in FIG. 15 via the reception component 1530. For example, 1108 in FIG. 11 illustrates the UE 1104 receiving SCI from the UE 1102 (e.g., the second UE) in a first transmission occasion.

The resource reservation may for transmission of a signal by the second UE in a first beam direction for the self-interference measurement by the second UE based on a second beam direction. The sidelink device (e.g., the first UE) may receive the SCI from the first beam direction and/or the second beam direction. The SCI may reserve resources in the second beam direction for the self-interference measurement.

The SCI may include an indication of the first beam direction and the second beam direction. The sidelink device (e.g., the first UE) may determine the second beam direction based on a TCI state included in the SCI. The sidelink device (e.g., the first UE) may determine the first beam direction based on a TCI state included in the SCI. The sidelink device (e.g., the first UE) may receive the SCI in the first transmission occasion on a wider beam than a first beam.

At 1304, the sidelink device (e.g., the first UE) may exclude resources indicated in the resource reservation from candidate resources for a sidelink transmission by the first UE. For example, 1304 may be performed by the exclusion component 1542 in FIG. 14. For example, 1116 in FIG. 11 illustrates the UE 1104 excluding resources indicated in the resource reservation from candidate resources for a sidelink transmission.

Figure 14:
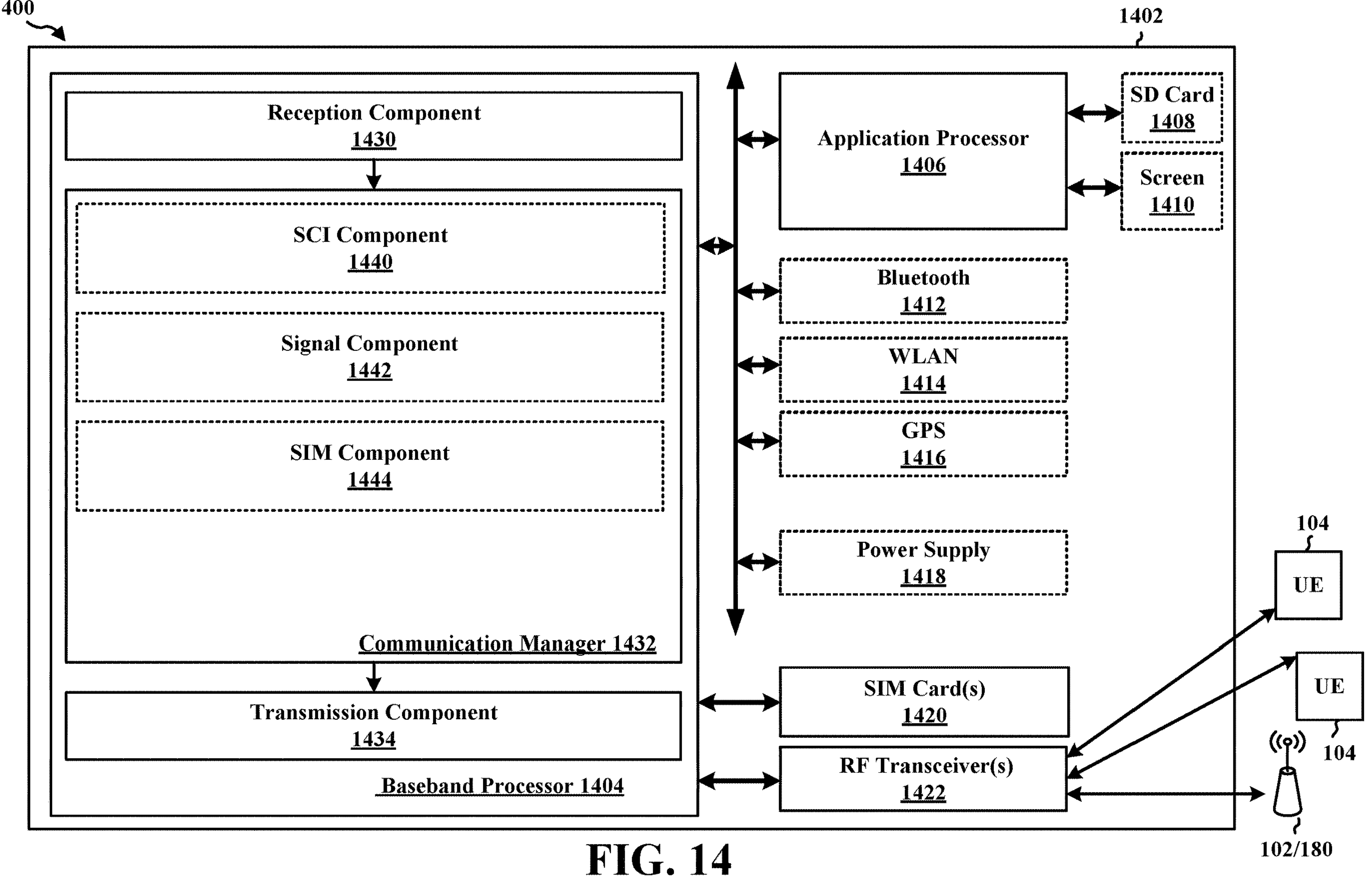
FIG. 14 is a diagram illustrating an example of a hardware implementation for an example apparatus.

FIG. 14 is a diagram 1400 illustrating an example of a hardware implementation for an apparatus 1402. The apparatus 1402 is a sidelink device, such as a UE and includes a baseband processor 1404 (also referred to as a modem) coupled to a RF transceiver 1422 and one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and a power supply 1418. The baseband processor 1404 communicates through the RF transceiver 1422 with the UE 104 and/or BS 102/180. In some examples, the baseband processor 1404 may include a cellular baseband processor, and the RF transceiver 1402 may include a cellular RF transceiver. The baseband processor 1404 may include a computer-readable medium/memory. The computer-readable medium/memory may be non-transitory. The baseband processor 1404 is responsible for general processing, including the execution of software stored on the computer-readable medium/memory. The software, when executed by the baseband processor 1404, causes the baseband processor 1404 to perform the various functions described supra. The computer-readable medium/memory may also be used for storing data that is manipulated by the baseband processor 1404 when executing software. The baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband processor 1404. The baseband processor 1404 may be a component of the device 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire wireless device (e.g., see 350 of FIG. 3) and include the additional modules of the apparatus 1402.

The communication manager 1432 includes an SCI component 1440 that is configured to transmit, in a first transmission occasion, SCI indicating a resource reservation for a self-interference measurement in a second transmission occasion, e.g., as described in connection with 1202 in FIG. 12. The communication manager 1432 further includes a signal component 1442 that is configured to transmit a signal, in the second transmission occasion, e.g., as described in connection with 1204 in FIG. 12. The communication manager 1432 further includes a SIM component 1444 that is configured to perform the self-interference measurement based on the signal in the second transmission occasion using at least a portion of resources indicated in the resource reservation, e.g., as described in connection with 1206 in FIG. 12.

The apparatus may include additional components that perform each of the blocks of the algorithm in the aforementioned flowcharts of FIG. 12. As such, each block in the aforementioned flowcharts of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband processor 1404, includes means for transmitting, in a first transmission occasion, SCI indicating a resource reservation for a self-interference measurement in a second transmission occasion; means for transmitting a signal, in the second transmission occasion; and means for performing the self-interference measurement based on the signal in the second transmission occasion using at least a portion of resources indicated in the resource reservation. The aforementioned means may be one or more of the aforementioned components of the apparatus 1402 configured to perform the functions recited by the aforementioned means. As described supra, the apparatus 1402 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 15:
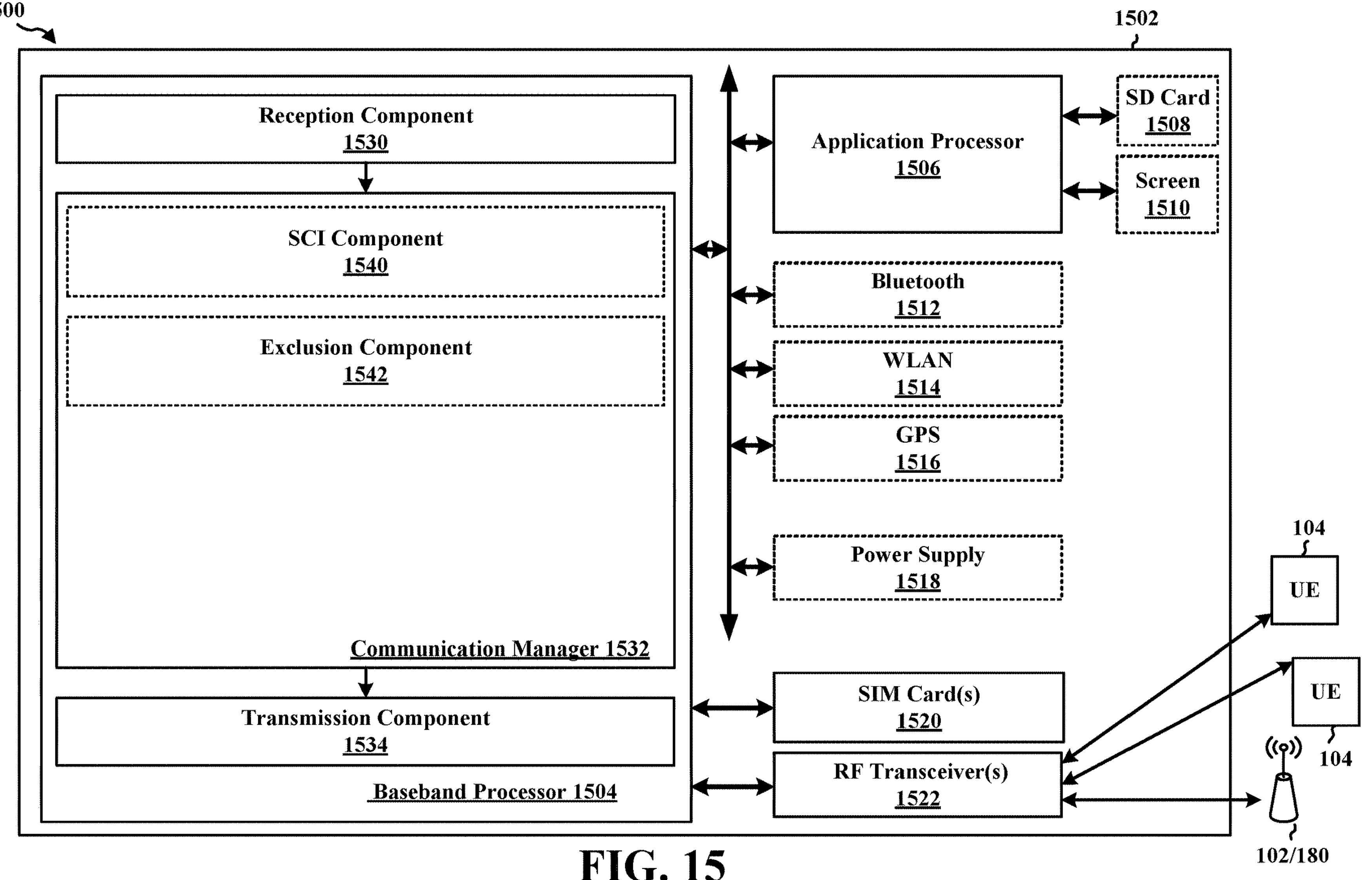
FIG. 15 is a diagram illustrating an example of a hardware implementation for an example apparatus.

FIG. 15 is a diagram 1500 illustrating an example of a hardware implementation for an apparatus 1502. The apparatus 1502 is a sidelink device, such as a UE and includes a baseband processor 1504 (also referred to as a modem) coupled to a RF transceiver 1522 and one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and a power supply 1518. The baseband processor 1504 communicates through the RF transceiver 1522 with the UE 104 and/or BS 102/180. In some examples, the baseband processor 1504 may include a cellular baseband processor, and the RF transceiver 1502 may include a cellular RF transceiver. The baseband processor 1504 may include a computer-readable medium/memory. The computer-readable medium/memory may be non-transitory. The baseband processor 1504 is responsible for general processing, including the execution of software stored on the computer-readable medium/memory. The software, when executed by the baseband processor 1504, causes the baseband processor 1504 to perform the various functions described supra. The computer-readable medium/memory may also be used for storing data that is manipulated by the baseband processor 1504 when executing software. The baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband processor 1504. The baseband processor 1504 may be a component of the device 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire wireless device (e.g., see 350 of FIG. 3) and include the additional modules of the apparatus 1502.

The communication manager 1532 includes a component SCI 1540 that is configured to receive, in a first transmission occasion, SCI from a second UE indicating a resource reservation for a self-interference measurement in a second transmission occasion, e.g., as described in connection with 1302 in FIG. 13. The communication manager 1532 further includes an exclusion component 1542 that is configured to exclude resources indicated in the resource reservation from candidate resources for a sidelink transmission by the first UE, e.g., as described in connection with 1304 in FIG. 13.

The apparatus may include additional components that perform each of the blocks of the algorithm in the aforementioned flowcharts of FIG. 13. As such, each block in the aforementioned flowcharts of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the baseband processor 1504, includes means for receiving, in a first transmission occasion, SCI from a second UE indicating a resource reservation for a self-interference measurement in a second transmission occasion; and means for excluding resources indicated in the resource reservation from candidate resources for a sidelink transmission by the first UE. The aforementioned means may be one or more of the aforementioned components of the apparatus 1502 configured to perform the functions recited by the aforementioned means. As described supra, the apparatus 1502 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following example aspects are illustrative only and may be combined with other or teachings described herein, without limitation.

Aspect 1 is a method of wireless communication at a user equipment (UE), including: transmitting, in a first transmission occasion, sidelink control information (SCI) indicating a resource reservation for a self-interference measurement in a second transmission occasion; transmitting a signal, in the second transmission occasion; and performing the self-interference measurement based on the signal in the second transmission occasion using at least a portion of resources indicated in the resource reservation.

Aspect 2 is the method of aspect 1, where the first transmission occasion corresponds to a first slot, and the second transmission occasion corresponds to a second slot.

Aspect 3 is the method of any of aspects 1 and 2, where the UE transmits the signal using a first transmission reception point (TRP) and performs the self-interference measurement at a second TRP different from the first TRP.

Aspect 4 is the method of any of aspects 1 and 2, where the UE transmits the signal using at least a first antenna element and performs the self-interference measurement using at least a second antenna element different from the first antenna element.

Aspect 5 is the method of any of aspects 1 to 4, where the resource reservation in the SCI indicates the resources for transmission of the signal in the second transmission occasion.

Aspect 6 is the method of aspect 5, where the resource reservation in the SCI further indicates additional resources in the second transmission occasion that extend beyond the resources for the transmission of the signal.

Aspect 7 is the method of any of aspects 5 and 6, where the resource reservation in the SCI indicates frequency resources spanning a frequency range associated with the second transmission occasion.

Aspect 8 is the method of any of aspects 1 to 7, where the SCI further indicates a first beam direction, and where the UE transmits the signal in the first beam direction.

Aspect 9 is the method of aspect 8, where the first beam direction is indicated by a transmission configuration indicator (TCI) state included in the SCI.

Aspect 10 is the method of any of aspects 1 to 9, where the UE transmits the signal in a first beam direction, and the UE performs the self-interference measurement based on a second beam direction.

Aspect 11 is the method of aspect 10, where the UE transmits the SCI in the first beam direction and the second beam direction.

Aspect 12. The method of aspect 11, where the UE transmits the SCI in a first message in the first beam direction and in a second message in the second beam direction, where at least the second message indicates the second beam direction associated with the self-interference measurement.

Aspect 13 is the method of aspect 12, where the second message reserves resources in the second beam direction for the self-interference measurement.

Aspect 14 is the method of any of aspects 12 and 13, where the UE transmits the second message in the first transmission occasion.

Aspect 15 is the method of any of aspects 12 and 13, where the UE transmits the second message in a different transmission occasion than the first transmission occasion.

Aspect 16 is the method of aspect 10, where the SCI includes an indication of the first beam direction and the second beam direction.

Aspect 17 is the method of aspect 16, where the second beam direction is indicated by a transmission configuration indicator (TCI) state included in the SCI.

Aspect 18 is the method of aspect 10, where the UE transmits the SCI in the first transmission occasion on a wider beam than a first beam.

Aspect 19 is the method of any of aspects 1 to 18, where the UE transmits the signal using first frequency resources and performs the self-interference measurement over second frequency resources that are different from the first frequency resources.

Aspect 20 is the method of any of aspects 1 to 18, where the UE transmits the signal in a first frequency range that at least partial overlaps with a second frequency range that the UE uses to perform the self-interference measurement.

Aspect 21 is the method of aspect 20, where the second frequency range spans an entire bandwidth of a sidelink frequency pool.

Aspect 22 is the method of any of aspects 1 to 21, where the signal includes a reference signal, and the self-interference measurement is based on a reference signal received power (RSRP) measurement.

Aspect 23 is the method of any of aspects 1 to 21, wherein the self-interference measurement is based on a received signal strength indicator (RSSI) measurement of the signal.

Aspect 24 is a device including one or more processors and one or more memories in electronic communication with the one or more processors storing instructions executable by the one or more processors to cause the device to implement a method as in any of aspects 1-23.

Aspect 25 is a system or apparatus including means for implementing a method or realizing an apparatus as in any of aspects 1-23.

Aspect 26 is a non-transitory computer readable storage medium storing instructions executable by one or more processors to cause the one or more processors to implement a method as in any of aspects 1-23.

Aspect 27 is a method of wireless communication at a first user equipment (UE), including: receiving, in a first transmission occasion, sidelink control information (SCI) from a second UE indicating a resource reservation for a self-interference measurement in a second transmission occasion; and excluding resources indicated in the resource reservation from candidate resources for a sidelink transmission by the first UE.

Aspect 28 is the method of aspect 27, where the resource reservation is for transmission of a signal by the second UE in a first beam direction for the self-interference measurement by the second UE based on a second beam direction.

Aspect 29 is the method of aspect 28, where the first UE receives the SCI from the first beam direction.

Aspect 30. The method of any of aspects 28 and 29, where the first UE receives the SCI from the second beam direction.

Aspect 31 is the method of any of aspects 28 to 30, where the SCI reserves resources in the second beam direction for the self-interference measurement.

Aspect 32 is the method of any of aspects 28 to 31, where the SCI includes an indication of the first beam direction and the second beam direction.

Aspect 33 is the method of any of aspects 28 to 32, further including: determining the second beam direction based on a transmission configuration indicator (TCI) state included in the SCI.

Aspect 34 is the method of any of aspects 28 to 33, further including: determining the first beam direction based on a transmission configuration indicator (TCI) state included in the SCI.

Aspect 35 is the method of any of aspects 28 to 34, where the first UE receives the SCI in the first transmission occasion on a wider beam than a first beam.

Aspect 36 is a device including one or more processors and one or more memories in electronic communication with the one or more processors storing instructions executable by the one or more processors to cause the device to implement a method as in any of aspects 27-35.

Aspect 37 is a system or apparatus including means for implementing a method or realizing an apparatus as in any of aspects 27-35.

Aspect 38 is a non-transitory computer readable storage medium storing instructions executable by one or more processors to cause the one or more processors to implement a method as in any of aspects 27-35.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:

transmitting, in a first transmission occasion, sidelink control information (SCI) indicating a resource reservation for a self-interference measurement in a second transmission occasion, wherein the resource reservation indicates at least a time-domain resource reservation associated with the second transmission occasion;

transmitting a signal, in the second transmission occasion using a first set of frequency resources; and performing the self-interference measurement based on the signal using at least a portion of resources indicated in the resource reservation, wherein the portion comprises a second set of frequency resources different from the first set of frequency resources.

2. The method of claim 1, wherein the first transmission occasion corresponds to a first slot, and the second transmission occasion corresponds to a second slot.

3. The method of claim 1, wherein the UE transmits the signal using a first transmission reception point (TRP) and performs the self-interference measurement at a second TRP different from the first TRP.

4. The method of claim 1, wherein the UE transmits the signal using at least a first antenna element and performs the self-interference measurement using at least a second antenna element different from the first antenna element.

5. The method of claim 1, wherein the resource reservation in the SCI indicates the resources for transmission of the signal in the second transmission occasion.

6. The method of claim 5, wherein the resource reservation in the SCI further indicates additional resources in the second transmission occasion that are different from the resources for the transmission of the signal.

7. The method of claim 5, wherein the resource reservation in the SCI indicates frequency resources spanning a frequency range associated with the second transmission occasion.

8. The method of claim 1, wherein the SCI further indicates a first beam direction, and wherein the UE transmits the signal in the first beam direction.

9. The method of claim 8, wherein the first beam direction is indicated by a transmission configuration indicator (TCI) state comprised in the SCI.

10. The method of claim 1, wherein the UE transmits the signal in a first beam direction, and the UE performs the self-interference measurement based on a second beam direction.

11. The method of claim 10, wherein the UE transmits the SCI in the first beam direction and the second beam direction.

12. The method of claim 11, wherein the UE transmits the SCI in a first message in the first beam direction and in a second message in the second beam direction, wherein at least the second message indicates the second beam direction associated with the self-interference measurement.

13. The method of claim 12, wherein the second message reserves resources in the second beam direction for the self-interference measurement.

14. The method of claim 12, wherein the UE transmits the second message in the first transmission occasion.

15. The method of claim 12, wherein the UE transmits the second message in a different transmission occasion than the first transmission occasion.

16. The method of claim 10, wherein the SCI comprises an indication of the first beam direction and the second beam direction.

17. The method of claim 16, wherein the second beam direction is indicated by a transmission configuration indicator (TCI) state comprised in the SCI.

18. The method of claim 10, wherein the UE transmits the SCI in the first transmission occasion on a wider beam than a first beam.

19. The method of claim 1, wherein the first set of frequency resources comprise a first frequency range that at least partially overlaps with a second frequency range of the second set of frequency resources.

20. The method of claim 19, wherein the second frequency range spans an entire bandwidth of a sidelink frequency pool.

21. The method of claim 1, wherein the signal comprises a reference signal, and the self-interference measurement is based on a reference signal received power (RSRP) measurement.

22. The method of claim 1, wherein the self-interference measurement is based on a received signal strength indicator (RSSI) measurement of the signal.

23. An apparatus for wireless communication of a user equipment (UE), comprising:

memory; and at least one processor coupled to the memory and configured to:

transmit, in a first transmission occasion, sidelink control information (SCI) indicating a resource reservation for a self-interference measurement in a second transmission occasion, wherein the resource reservation indicates at least a time-domain resource reservation associated with the second transmission occasion;

transmit a signal, in the second transmission occasion based on a first set of frequency resources; and perform the self-interference measurement based on the signal using at least a portion of resources indicated in the resource reservation, wherein the portion comprises a second set of frequency resources different from the first set of frequency resources.

24. The apparatus of claim 23, wherein the first set of frequency resources comprise a first frequency range that at least partially overlaps with a second frequency range of the second set of frequency resources.

25. A method of wireless communication at a first user equipment (UE), comprising:

receiving, in a first transmission occasion, sidelink control information (SCI) from a second UE indicating a resource reservation for a self-interference measurement in a second transmission occasion, wherein the resource reservation indicates at least a time-domain resource reservation associated with the second transmission occasion; and excluding resources indicated in the resource reservation from candidate resources for a sidelink transmission by the first UE, wherein the sidelink transmission is based on a first set of frequency resources, wherein the self-interference measurement is based on a second set of frequency resources, and wherein the first set of frequency resources is different from the second set of frequency resources.

26. The method of claim 25, wherein the resource reservation is for transmission of a signal by the second UE in a first beam direction for the self-interference measurement by the second UE based on a second beam direction.

27. The method of claim 26, wherein the first UE receives the SCI from the first beam direction.

28. The method of claim 26, wherein the first UE receives the SCI from the second beam direction.

29. The method of claim 26, wherein the SCI reserves resources in the second beam direction for the self-interference measurement.

30. An apparatus for wireless communication at a first user equipment (UE), comprising:

memory; and at least one processor coupled to the memory and configured to:

receive, in a first transmission occasion, sidelink control information (SCI) from a second UE indicating a resource reservation for a self-interference measurement in a second transmission occasion, wherein the resource reservation indicates at least a time-domain resource reservation associated with the second transmission occasion; and exclude resources indicated in the resource reservation from candidate resources for a sidelink transmission by the first UE, wherein the sidelink transmission is based on a first set of frequency resources, wherein the self-interference measurement is based on a second set of frequency resources, and wherein the first set of frequency resources is different from the second set of frequency resources.

* * * * *